(12) United States Patent
Ushiyama

(10) Patent No.: US 8,903,885 B2
(45) Date of Patent: Dec. 2, 2014

(54) INFORMATION COMMUNICATION SYSTEM, NODE DEVICE, INFORMATION PROCESSING METHOD AND COMPUTER-READABLE STORAGE MEDIUM

(75) Inventor: Kentaro Ushiyama, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 209 days.

(21) Appl. No.: 13/074,837

(22) Filed: Mar. 29, 2011

(65) Prior Publication Data

US 2011/0270907 A1 Nov. 3, 2011

(30) Foreign Application Priority Data

Apr. 28, 2010 (JP) ................................ 2010-104077

(51) Int. Cl.
G06F 15/16 (2006.01)
H04L 29/08 (2006.01)
H04L 29/06 (2006.01)

(52) U.S. Cl.
CPC ...... *H04L 67/1065* (2013.01); *H04L 29/08729* (2013.01); *H04L 69/28* (2013.01)
USPC ............................ 709/201; 709/202; 709/203

(58) Field of Classification Search
CPC ............. H04L 29/08072; H04L 29/06; H04L 29/08135; H04L 29/08144; H04L 29/0809
USPC ......................................... 709/201, 202, 203
See application file for complete search history.

(56) References Cited

U.S. PATENT DOCUMENTS

| | | | | |
|---|---|---|---|---|
| 5,048,014 | A * | 9/1991 | Fischer | 370/258 |
| 5,630,059 | A * | 5/1997 | Brady et al. | 709/217 |
| 5,651,006 | A * | 7/1997 | Fujino et al. | 370/408 |
| 5,706,516 | A * | 1/1998 | Chang et al. | 719/314 |
| 6,167,427 | A * | 12/2000 | Rabinovich et al. | 709/201 |
| 6,621,824 | B1 * | 9/2003 | Lauffenburger et al. | 370/412 |
| 7,633,870 | B2 * | 12/2009 | Elliot | 370/235 |
| 7,809,890 | B2 * | 10/2010 | Takase et al. | 711/128 |

(Continued)

FOREIGN PATENT DOCUMENTS

| | | |
|---|---|---|
| JP | A-2002-007257 | 1/2002 |
| JP | A-2006-227763 | 8/2006 |

(Continued)

OTHER PUBLICATIONS

Jan. 8, 2014 Office Action issued in Japanese Patent Application No. 2010-104077 (with translation).

(Continued)

*Primary Examiner* — Michael J Moore, Jr.
*Assistant Examiner* — Siren Wei
(74) *Attorney, Agent, or Firm* — Oliff PLC

(57) ABSTRACT

An information communication system comprising a plurality of node devices connected to a network, in which data to be distributed and stored in the plurality of node devices, and the data is divided into a plurality of items of division data, and the other node device acquires the division data from the node device storing the division data. The node device comprises a controlling unit configured to permit the node device indicated by a second identification information contained in the request information to acquire the division data indicated by a first identification information contained in the request information, in early order of the time when the request information is received based on the time information stored in the second storing unit.

11 Claims, 8 Drawing Sheets

(56) References Cited

U.S. PATENT DOCUMENTS

| | | | |
|---|---|---|---|
| 2003/0061282 A1* | 3/2003 | Ebata et al. | 709/203 |
| 2005/0030903 A1* | 2/2005 | Al-Zain et al. | 370/252 |
| 2007/0086330 A1* | 4/2007 | Suzuki et al. | 370/217 |
| 2008/0244673 A1 | 10/2008 | Matsuo | |
| 2009/0006689 A1* | 1/2009 | Lubbers et al. | 710/112 |
| 2009/0210914 A1 | 8/2009 | Suzuki | |

FOREIGN PATENT DOCUMENTS

| | | |
|---|---|---|
| JP | A-2008-250370 | 10/2008 |
| JP | A-2009-193460 | 8/2009 |
| JP | A-2009-533754 | 9/2009 |
| WO | WO 2007/117251 A1 | 10/2007 |

OTHER PUBLICATIONS

Sakashita et al., "Interruption Time Reduction Methods Considering Importance of Divided Data for P2P Streaming Environments", Collected Papers of Symposium of Multimedia, Dispersion, Harmony and Mobile (DICOMO 2009), Corporate Juridical Person, Information Processing Society, Jul. 1, 2009, vol. 2009, pp. 424-430 (with abstract).

* cited by examiner

INFORMATION COMMUNICATION SYSTEM, NODE DEVICE, INFORMATION PROCESSING METHOD AND COMPUTER-READABLE STORAGE MEDIUM

The entire disclosure of the Japanese Patent Application No. 2010-104077, including the specification, the scope of claims, drawings, and abstract, filed on Apr. 28, 2010 is incorporated herein by reference in its entirety.

BACKGROUND OF THE INVENTION

1. Field of the Invention

The present invention relates to a technical field of an overlay network system. Especially, the technical field is a peer-to-peer (P2P) communication system comprising a plurality of node devices capable of mutually communicating via a network.

2. Description of the Related Art

In recent years, a peer-to-peer communication system is paid attention. In the peer-to-peer communication system, one content is divided into a plurality of items of data to be distributed and stored in a plurality of node devices. Each divided data is called "division data." For example, in the conventional technique, when a node device acquires a content, the node device requesting the content requests division data constituting the content from another node device. A node device receiving the request uploads the requested division data on the requesting node device each time. When downloading and storing the division data, the node device performs a processing of publicizing that it is storing the division data. Accordingly, even before the acquisition of the entire content is completed, another node device can acquire the division data from the node device storing the division data therein. In this manner, a load for uploading the content is distributed in a plurality of node devices. All the division data constituting the content is acquired so that the acquisition of the entire content is completed.

SUMMARY OF THE INVENTION

However, a node device storing division data therein may receive a request for the division data from a plurality of node devices. In this case, the requested node device will upload the division data on the plurality of node devices in parallel. At this time, a load on the uploading node device may increase. A sufficient band for uploading the division data on the plurality of node devices may not be obtained due to a limitation on a band width of a communication line. In this case, transfer speeds of the division data to the plurality of node devices delay. Therefore, in each node device requesting the division data, the completion of the acquisition of the division data is delayed. Since the fact that the division data is being stored is not publicized until the acquisition of the division data is completed, the load for uploading the content cannot be efficiently distributed. The completion of the acquisition of the entire content may delay due to the delay of the acquisition of the division data.

The present invention has been therefore made in terms of the above. It is an object of the present invention to enable division data to be early publicized when a node device acquires a content divided into a plurality of items of division data, and to enable a time required to acquire the entire content to be shortened.

Aspects of the invention may provide an information communication system comprising a plurality of node devices connected to a network, in which data to be distributed and stored in the plurality of node devices, and the data is divided into a plurality of items of division data, and the other node device acquires the division data from the node device storing the division data therein, wherein the node device comprises:

a transmitting unit which transmits request information containing first identification information for identifying the division data constituting a content to be requested, and second identification information for identifying the node device requesting data, to a first node device configured to store the division data indicated by the first identification information;

a first acquiring unit configured to acquire the division data indicated by the first identification information from the first node device;

a first storing unit which stores the division data acquired by the first acquiring unit; and a publicizing unit configured to enable the division data stored in the first storing unit to be acquired by the other node device, and the at least one first node device comprises:

a first receiving unit which receives the request information transmitted from the other node device;

a second storing unit which stores the second identification information contained in the request information received by the first receiving unit, and time information indicating when the request information is received, corresponding to each other; and a controlling unit configured to permit the node device indicated by the second identification information contained in the request information to acquire the division data indicated by the first identification information contained in the request information, in early order of the time when the request information is received based on the time information stored in the second storing unit.

Aspects of the invention may provide a node device in an information communication system comprising a plurality of node devices connected to a network, in which date to be distributed and stored in the plurality of node devices, and the data is divided into a plurality of items of division data, and the other node device acquires the division data from the node device storing the division data therein, at least one node device comprising:

a first receiving unit which receives request information containing first identification information for identifying the division data constituting a requested content, and second identification information for identifying the node device requesting a content, from the other node device;

a second storing unit which stores the second identification information received by the first receiving unit, and time information indicating when the request information is received, corresponding to each other; and a controlling unit configured to permit the node device indicated by the second identification information contained in the request information to acquire the division data indicated by the first identification information contained in the request information in early order of the time when the request information stored in the second storing unit is received based on the time information stored in the second storing unit.

Aspects of the invention may provide an information processing method in an information communication system comprising a plurality of node devices connected to a network, in which data to be distributed and stored in the plurality of node devices, and the data is divided into a plurality of items of division data, and the other node device acquires the division data from the node device storing the division data therein, the method including steps in the node device and steps in at least one first node device, the steps in the node device, comprising:

transmitting request information containing first identification information for identifying the division data constituting a content to be requested, and second identification information for identifying the node device requesting a content, to a first node device configured to store the division data indicated by the first identification information therein;

acquiring the division data indicated by the first identification information contained in the request information transmitted in the transmitting step, from the first node device;

first-storing the division data acquired in the acquiring step; and enabling the division data stored in the first storing step to be acquired by the other node device, and the steps in the at least one first node device, comprising:

first-receiving the request information transmitted from the other node device;

second-storing the second identification information contained in the request information received in the first receiving step, and time information indicating when the request information is received, corresponding to each other; and enabling the node device indicated by the second identification information contained in the request information to acquire the division data indicated by the first identification information contained in the request information, in early order of the request when the request information is received, based on the time information stored in the second storing step.

Aspects of the invention may provide a non-transitory computer-readable storage medium that stores a computer-executable program, the program causing a computer included in at least one node device in an information communication system comprising a plurality of node devices connected to a network, in which data to be distributed and stored in the plurality of node devices, and the data is divided into a plurality of items of division data, and the other node device acquires the division data from the node device storing the division data therein, to perform steps comprising:

first-receiving request information containing first identification information for identifying the division data constituting a requested content, and second identification information for identifying the node device requesting a content, from the other node device;

second-storing the second identification information received in the first receiving step, and time information indicating when the request information is received, corresponding to each other; and permitting the node device indicated by the second identification information contained in the request information to acquire the division data indicated by the first identification information contained in the request information in early order of the receipt when the request information is received based on the time information stored in the second storing step.

DETAILED DESCRIPTION OF THE EMBODIMENTS

An embodiment of the present invention will be described below with reference to the drawings. The embodiment described below is a case in which the present invention is applied to a content distribution/storage system.

[1. Schematic Structure and Operational Outline of Content Distribution/Storage System]

Figure 1:
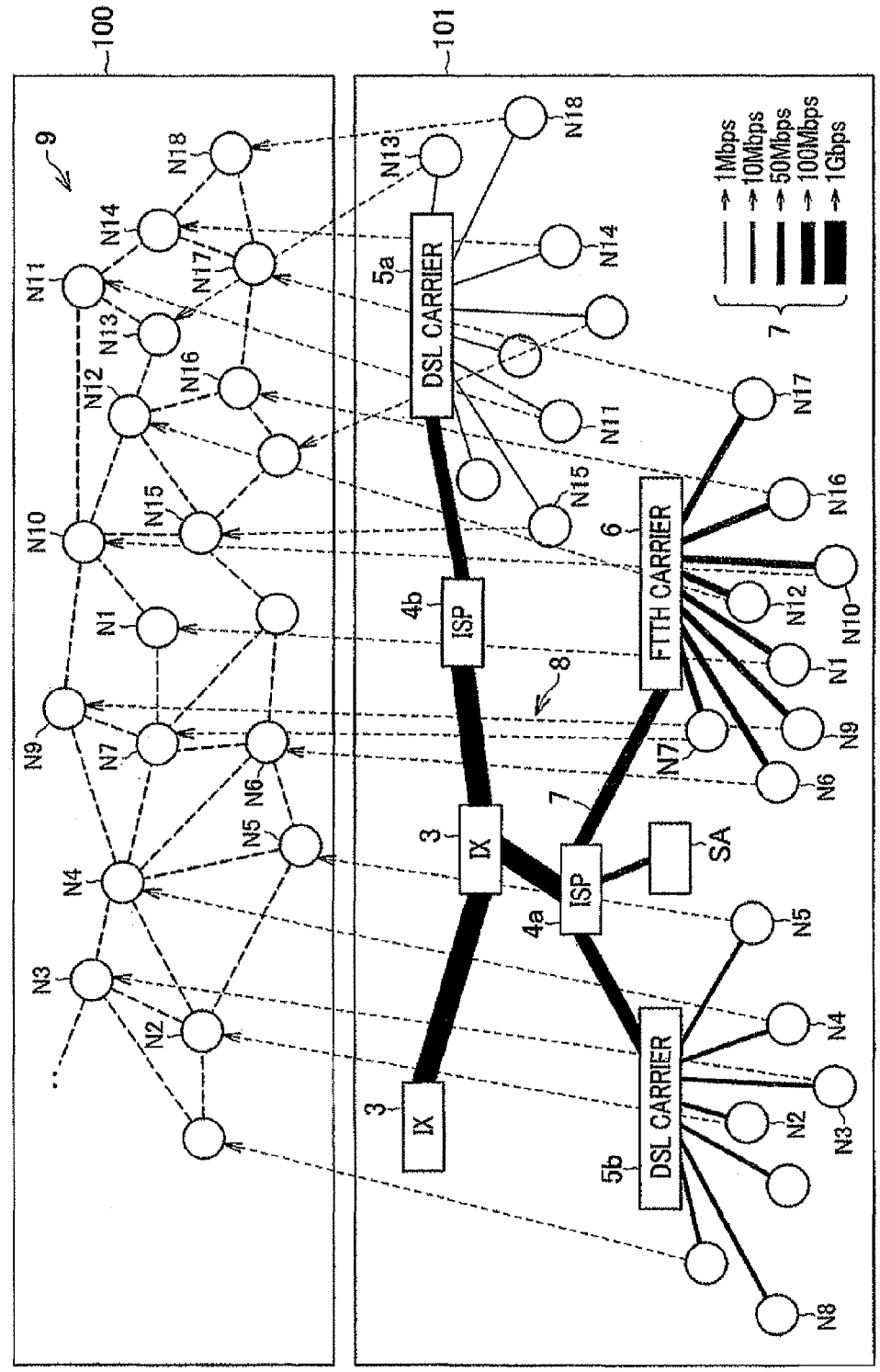
FIG. 1 is a diagram showing an exemplary connection form of node devices in a content distribution/storage system S.

At first, a structure and an operational outline of a content distribution/storage system according to the embodiment will be described with reference to FIG. 1. FIG. 1 is configured of a specific structure diagram 101 and a conceptual structure diagram 100 of the content distribution/storage system S. As illustrated in the specific structure diagram 101 of the content distribution/storage system S, the content distribution/storage system S is configured of many node devices Nn (n=1, 2, 3, . . . ).

As shown in the specific structure diagram 101 of FIG. 1, the node devices Nn are connected to each other via the Internet so that the content distribution/storage system S is configured. As shown in the lower frame 101 of FIG. 1, a network 8 such as Internet is constructed of an IX (Internet exchange) 3, ISP (Internet Service Provider) 4a, 4b, DSL (Digital Subscriber Line) carrier devices 5a, 5b, a FTTH (Fiber To The Home) carrier device 6 and a communication line 7. The network 8 is a real-world communication network. A router for transferring data packets is inserted into the network 8 shown in the example of FIG. 1 as needed, but is not illustrated in FIG. 1. The communication line 7 employs a telephone line or an optical cable, for example.

A plurality of node devices Nn are connected to the network 8. In the following, the node device Nn is called "node." Each node is assigned with a unique product number and an IP (Internet Protocol) address. The content distribution/storage system S according to the present embodiment is a peer-to-peer network system formed by connecting any nodes among the nodes as shown in the conceptual structure diagram 100 of FIG. 1.

A network 9 shown in the conceptual structure diagram 100 of FIG. 1 is an overlay network 9. The overlay network 9 constitutes a virtual link formed by the existing network 8. The overlay network 9 is a logical network. The overlay network 9 is realized by a specific algorithm, for example, a DHT algorithm. A node ID is assigned to a node connected to the content distribution/storage system S. The node ID is unique identification information formed of a predetermined number of digits.

The node stores a routing table using DHT (Distributed Hash Table) therein. The routing table defines therein transfer destinations of various messages on the content distribution/storage system S. Specifically, a plurality of items of node information are registered in the routing table. The node information contains a node ID, an IP address and a port number. The node ID registered in the routing table is for moderately-distant nodes in an ID space. One node connected to the content distribution/storage system S stores the node information on essential nodes in the routing table. Various massages are mutually transferred among the nodes so that the node information on a node not storing the node information therein can be acquired.

Various different contents are distributed and stored in the nodes in the content distribution/storage system S. Each content is assigned with a content name and a content ID. The content ID is unique identification information per content. The attribute information such as content name and content ID of each content is described in content catalog information. The content catalog information is created by the center server SA and distributed to all the nodes.

Each content is divided into a plurality of items of data. The divided data is called "chunk." Each chunk is generated by the center server SA, for example. The center server SA divides the content in a predetermined data size to generate chunks. The chunks are distributed and stored in a plurality of nodes. Thus, the content is distributed and stored in the nodes. The original of each chunk is stored in the center server SA. Each chunk is assigned with a sequence number and a chunk ID. For example, the sequence number corresponds to an arrangement order when a plurality of divided chunks are arranged to constitute the original content. The chunk ID is unique identification information per chunk.

When acquiring the content ID of a content, each node can acquire the chunk ID of each chunk constituting the content. Specifically, the content corresponding to the acquired content ID is decided. Then, the chunk ID of each chunk constituting the decided content is decided. The decided chunk ID and the sequence number of the chunk ID can be acquired to be associated with each other. For example, the chunk ID may be described in the attribute information of the original content in the content catalog information in association with the sequence number.

A node storing a chunk therein is called "holder node." The address of the chunk is stored as index information in a node managing or storing the address of the chunk therein. In the following, the node managing the address of the chunk is called "root node." The index information contains a pair of node information of a node storing a chunk therein and chunk ID of the chunk. The root node is defined to have the node ID nearest to the chunk ID. The node ID nearest to the chunk ID is a node ID whose upper digits match the most.

When a user of a certain node wants to acquire a desired content, the node retrieves a holder node. At this time, the holder node to be retrieved is storing each chunk constituting the desired, content therein. In the following, the node for which the user wants to acquire a chunk is called "user node." Specifically, the user node transmits a retrieval message. The retrieval message contains the chunk ID of the chunk to be acquired and the node ID of the user node. The retrieval message is transmitted to another node according to the DHT routing table stored in the user node. That is, the user node transmits the retrieval message to the root node. Thus, the retrieval message will finally arrive at the root node by the DHT routing with the chunk ID as a key. The DHT routing is well known in U.S. Publication US2007-283043 (A1), which is incorporated herein by reference and hence the detailed explanation thereof is omitted.

When receiving the retrieval message, the root node acquires one item or a plurality of items of index information corresponding to the chunk ID contained in the received retrieval message from an index information cache. The acquired index information is returned to the user node as the transmission source of the retrieval message. The user node which acquires the index information in this way acquires or downloads the chunk based on the index information. Specifically, the user node transmits a chunk request message to the holder node based on the IP address and the port number of the holder node contained in the index information. The chunk request message contains the node information of the user node, the content ID of the desired content, and the chunk ID of the chunk to be acquired.

When receiving the chunk request message, the holder node transmits or uploads the chunk corresponding to the chunk ID contained in the chunk request message to the user node. On the other hand, when the holder node storing the desired chunk therein is not present, the user node cannot acquire the index information of the holder node. In this case, the user node acquires the chunk from the center server SA. The control contents of the chunk upload when the holder node receives the chunk request message will be described later in detail.

When acquiring and storing the chunk from the holder node, the user node publicizes the chunk. The publication of the chunk is to notify the root node that the user node has stored the chunk as the holder node. Another node can acquire the publicized chunk from the publicizing holder node due to the publication of the chunk. Specifically, the user node storing the chunk therein transmits a publish message. The publish message contains the node information on the chunk ID of the chunk and the user node storing the chunk therein. The publish message is sent toward the root node. Thereby, the publish message will arrive at the root node by the DHT routing with the chunk ID as a key similar to the retrieval message. The root node stores the index information containing a pair of node information and chunk ID in the index information cache. The node information and the chunk ID are contained in the received publish message. The user node will be a new holder node storing the chunk therein.

[2. Chunk Upload Control]

In the present embodiment, when receiving the chunk request message, the holder node uploads the chunk on the user node. In this case, when receiving the chunk request messages from a plurality of user nodes at the same time, the holder node has to upload the chunk on the user nodes at the same time. At this time, when a load on the holder node increases, the transfer speed of the chunk toward each user node slows. When the band width of the communication line for connecting the holder node to the network 8 is narrow, a sufficient band for uploading the chunk on each user node cannot be obtained. Also in this case, the transfer speed of the chunk toward each user node slows. The holder node may use a predetermined queue and a table to control the acquisition of the chunk by the user node. The control of the acquisition of the chunk by the user node may be conducted by controlling the upload of the chunk on the user node by the holder node. The queue used for the control is called "request queue." The table used for the control is called "request management table." The request queue and the request management table are stored in the node.

The request queue may store the received chunk request messages therein. Then, the stored chunk request messages may be ranked and extracted from the request queue. Specifically, the request queue may store the node information contained in the chunk request message in association with the content ID and the chunk ID therein. The chunk request message may be extracted from the request queue in early order of the request time of content. The request management table may register therein the node ID of the node requesting the content, the content ID of the requested content and the request time in an associated manner for the management of the request time. The user node transmits the chunk request message per chunk constituting the content to be acquired in order to acquire the content. Thus, the holder node may receive a plurality of chunk request messages having different chunk IDs and the same pair of node ID and content ID. The request time is when the chunk request message is received. The chunk request message received at this time contains the pair of node ID and content ID not registered in the request management table. When receiving the chunk request message, the holder node may decide whether the pair of node ID and content ID in the node information contained in the chunk request message has been already registered in the request management table. Then, when the pair of node ID and content ID is not registered, the holder node may register the pair in the request management table. The holder node may register the current time as the request time. When receiving the chunk request message, the holder node may decide the order in which the chunk request messages are extracted based on the information registered in the request management table. Then, the holder node may store the received chunk request messages in the request queue such that the chunk request messages are extracted in the decided order. When a predetermined time has elapsed from the request time, the holder node may delete the registered node ID, content ID and request time from the request management table.

On one hand, the holder node may extract the chunk request message from the request queue. Then, the holder node may permit the user node to acquire the chunk. Specifically, the holder node may acquire the chunk corresponding to the chunk ID contained in the extracted chunk request message. The holder node may upload the acquired chunk on the user node. At this time, the user node to be uploaded corresponds to the node ID in the node information contained in the chunk request message extracted from the request queue. When completing the upload, the holder node may extract the next chunk request message from the request queue to perform uploading. That is, the holder node sequentially may permit the user node to acquire the chunk. In other words, the holder node may cause the user node transmitting the chunk request message to wait for the acquisition of the chunk until it extracts the chunk request message from the request queue. Thereby, the number of uploads to be simultaneously performed may be limited. Thus, the load on the holder node decreases. A wide band for uploading the chunk on each user node can be obtained. Thereby, the transfer speed increases. The user node for which the request time of the content is earlier can quickly acquire the chunk.

A specific example will be described with reference to FIGS. 2 and 3. It is assumed for the specific example shown in FIGS. 2 and 3 that contents X, Y and Z are present. The content X is configured of chunks XA and XB. The content Y is configured of chunks YA and YB. The content Z is configured of chunks ZA and ZB. The node N10 stores the chunks XA, XB, YA, YB, ZA and ZB therein. That is, the node N10 is a holder node for the chunks. No information is registered in the request queue and the request management table stored in the node NW.

Figure 2:
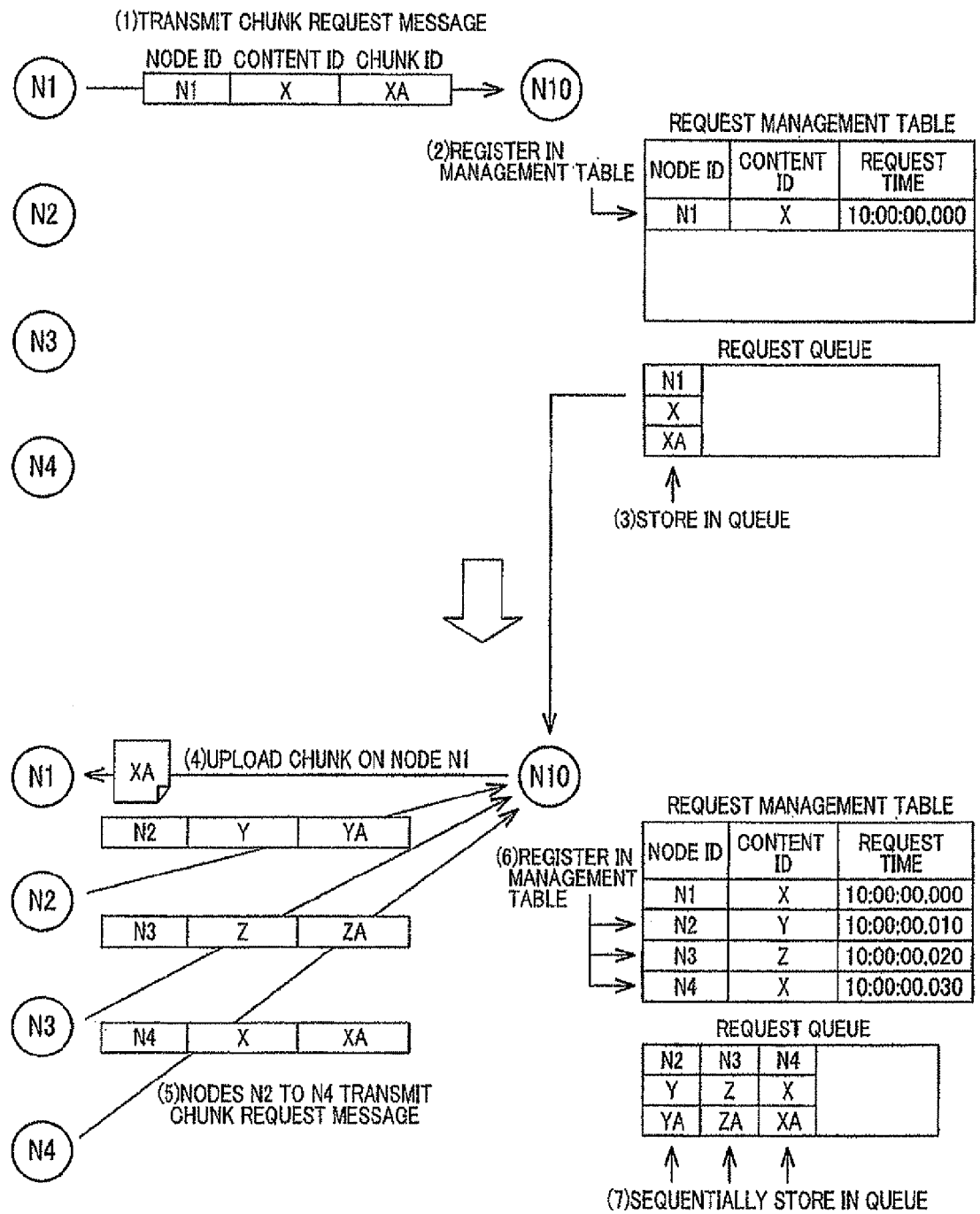
FIG. 2 is a diagram showing one example of how uploading a chunk for a received chunk request message is controlled by a holder node.
Figure 3:
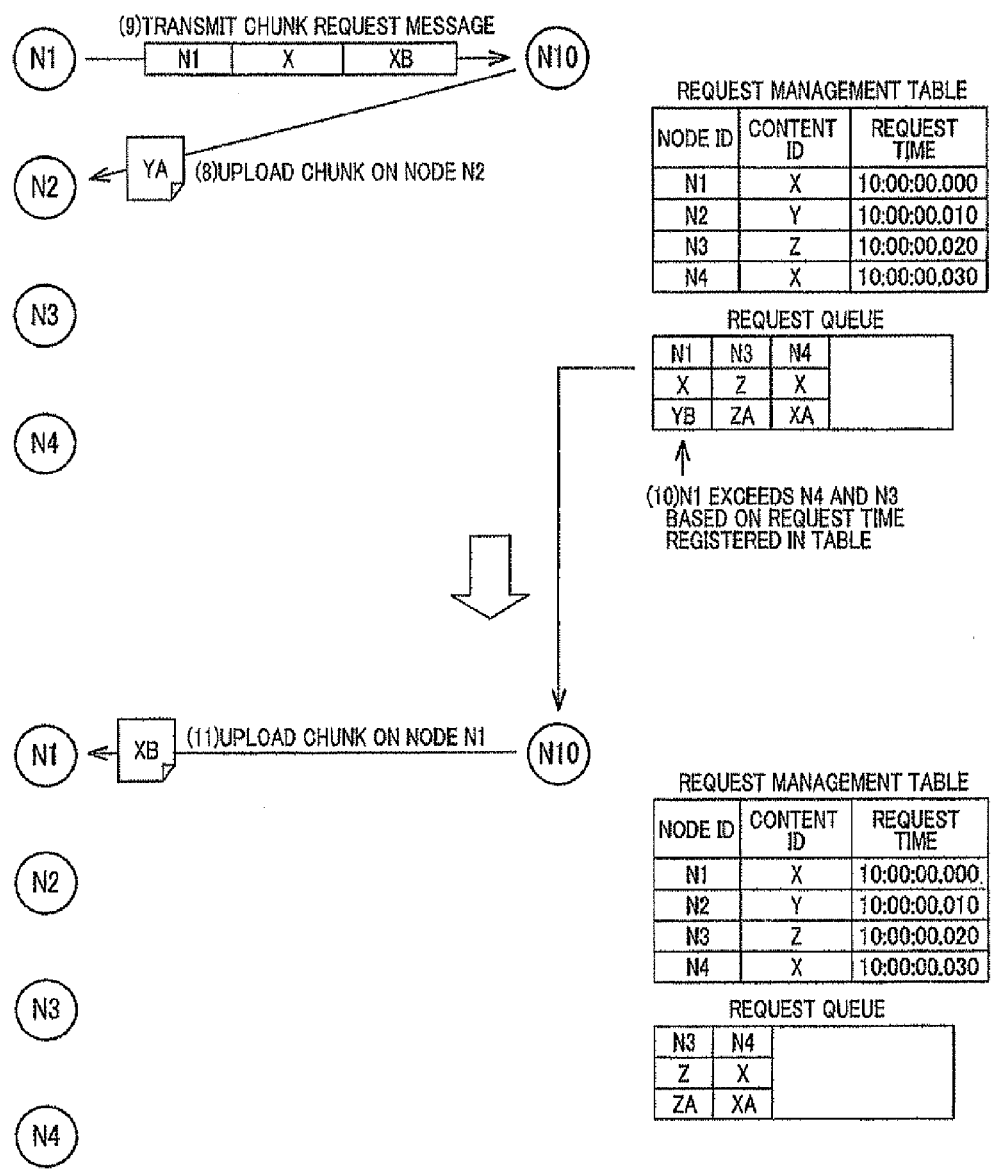
FIG. 3 is a diagram showing one example of how uploading a chunk for a received chunk request message is controlled by a holder node.

At first, it is assumed that the node N1 as user node requests the chunk XA for the node N10 (FIG. 2(1)). That is, the node N1 transmits the chunk request message to the node N10. The chunk request message transmitted at this time contains the node ID of the node N1, the content ID of the content X and the chunk ID of the chunk XA. When receiving the chunk request message, the node N10 registers the node ID of the node N1, the content ID of the content X and the current time contained in the chunk request message in the request management table (FIG. 2(2)). The node N10 stores the chunk request message in the request queue (FIG. 2(3)).

The chunk request message from the node N1 is stored in the request queue to be first extracted. Thus, the node N10 extracts, from the request queue, the chunk request message from the node N1. Then, the node N10 starts uploading the chunk XA on the node N1 based on the extracted chunk request message (FIG. 2(4)). It is assumed that each node transmits the chunk request message to the node N10 in order of node N2, node N3 and node N4 while the node N10 is uploading the chunk XA on the node N1 (FIG. 2(5)). For example, the chunk request message transmitted by the node N2 contains the content ID of the content Y and the chunk ID of the chunk YA therein. The chunk request message transmitted by the node N3 contains the content ID of the content Z and the chunk ID of the chunk ZA therein. The chunk request message transmitted by the node N4 contains the content ID of the content X and the chunk ID of the chunk XA therein. Whenever receiving the chunk request message, the node N10 registers the node IDs and content IDs contained in the respective chunk request messages, and the current times in the request management table (FIG. 2(6)). The request times registered in the request management table are early in order of nodes N1, N2, N3 and N4. Thus, the node N10 sequentially stores the chunk request messages from the nodes N2 to N4 in the request queue to be extracted in the reception order (FIG. 2(7)).

When completing the upload on the node N1, the node N10 extracts, from the request queue, the chunk request message from the node N2. Then, the node N10 starts uploading the chunk YA on the node N2 (FIG. 3(8)). It is assumed that the node N1 transmits the chunk request message to the node N10 while the node N10 is uploading the chunk YA on the node N2 (FIG. 3(9)). The chunk request message contains the content ID of the content X and the chunk ID of the chunk XB therein. The pair of node ID and content ID contained in the chunk request message has been already registered in the request management table. Thus, when receiving the chunk request message, the node N10 does not register the pair in the request management table. Then, the node N10 stores the chunk request message in the request queue. At this time, the request queue contains the following chunk request messages. The stored massages are the chunk request message for requesting the chunk ZA of the content Z by the node N3 and the chunk request message for requesting the chunk XA of the content X by the node N4. In the request management table, the request time of the content X by the node N1 is earlier than the request time of the content Z by the node N3 and the request time of the content X by the node N4. Thus, the node N10 stores the chunk request messages in the request queue such that the chunk request message by the node N1 is the first ahead of the chunk request messages by the nodes N3 and N4 (FIG. 3(10)).

Thereafter, when completing the upload on the node N2, the node N10 extracts, from the request queue, the chunk request message from the node N1. Then, the node N10 starts uploading the chunk XB on the node N1 (FIG. 3(11)).

The holder node uploads a chunk ahead of the user node requesting a chunk constituting a content having many waiting nodes. The number of waiting nodes is the number of user nodes waiting for the acquisition of the chunk. The number of waiting nodes is calculated per content. For example, in the example shown in FIGS. 2 and 3, it is assumed that the node N10 receives the chunk request messages from the nodes N2 to N4 before extracting the chunk request message by the node N1 from the request queue (FIG. 2(5)). In this case, the numbers of waiting nodes of the contents X, Y and Z are 2, 1, 1, respectively. That is, the number of waiting nodes of the content X is more than the numbers of waiting nodes of the contents Y and Z. In this case, the node N10 stores the chunk request messages in the message queue such that the chunk request message from the node N4 is extracted earlier than the nodes N2 and N3. The node N1 and the node N4 have the same content and the same number of waiting nodes. The request time of the node N1 is earlier than the request time of the node N4. In this case, the chunk request message from the node N1 is put ahead. Consequently, the chunk request messages are extracted in order of nodes N1, N4, N2 and N3. In this way, the number of holder node storing the chunk constituting the content having many waiting nodes rapidly increases. Thus, for example, the concentration of the requested chunk constituting the popular content on the holder node is earlier eliminated.

The request queue and the request management table may be stored in not only the node but also the server SA. In this case, the similar processing to the above holder node may be performed. Each holder node may perform multiple uploads at the same time. As far as the transfer speed for uploading the chunk is equal to or more than the required speed for the system, multiple uploads may be performed at the same time. In this case, for example, the maximum number of possible uploads at the same time is predefined per node. In this case, the holder node generates a plurality of threads, for example. Then, in each thread, the chunk request message is extracted from the request queue and the chunk is uploaded.

The above chunk upload control is effective also for systematically distributing the contents. The systematic content distribution is to distribute a certain content to at least some nodes among a plurality of nodes at a predetermined timing, for example. For example, the content X configured of the chunks XA, XB, XC, . . . is to be systematically distributed. The center server SA initially stores each chunk. When the time for starting distributing the content X arrives, the nodes N1 and N2 start acquiring the chunk XA from the center server SA, for example. The nodes N1 and N2 sequentially acquire the chunks XA, XB, XC, . . . . The nodes N1 and N2 first starting acquiring the chunk is assumed to be group 1. After a predetermined time has elapsed since the group 1 started acquiring the chunk XA, the nodes N3 to N6, for example, start acquiring the chunk XA from the group 1 and sequentially acquire the chunks XA, XB, XC, . . . . The nodes N3 to N6 second starting acquiring the chunk is assumed to be group 2. In this manner, for example, the number of nodes acquiring the chunks sequentially increases and finally all the nodes to be distributed complete the acquisition of the entire content X.

[3. Structure and Functions of Each Device]

The structure and functions of the device will be described below with reference to FIGS. 4 and 5.

[3.1 Structure of Center Server SA]

Figure 4:
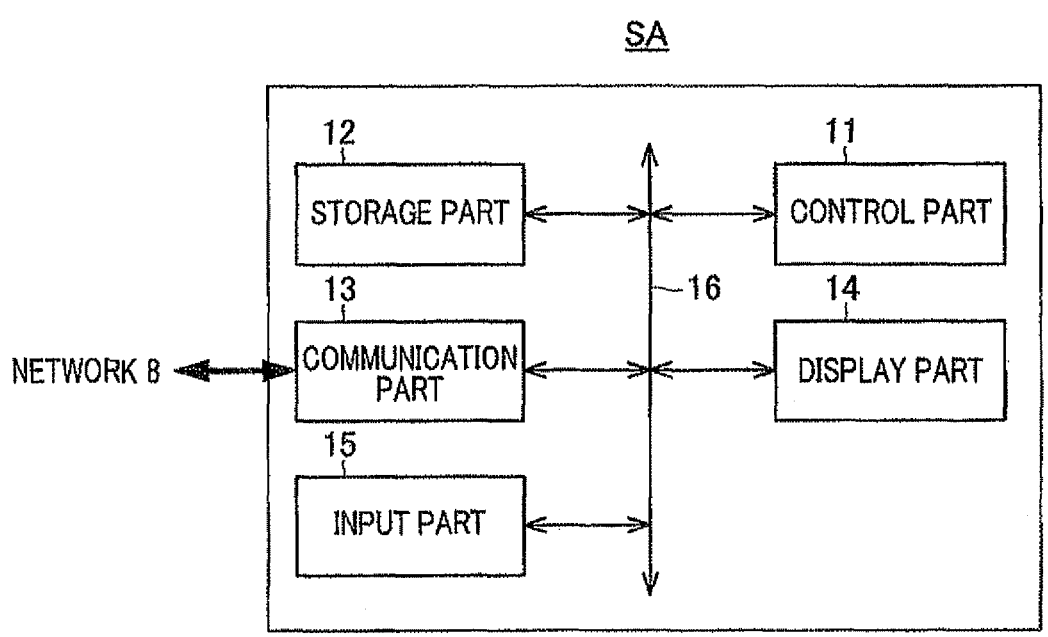
FIG. 4 is a diagram showing a schematic structure example of a center server SA.

As shown in FIG. 4, the center server SA comprises a control part 11. The control part 11 is configured of a CPU, a working RAM and a ROM. The CPU has a computing function. The ROM stores various items of data and programs therein. The center server SA comprises a storage part 12. The storage part 12 is configured of a HD (hard disk). The storage part 12 stores and saves various items of data and various programs therein. Further, the center server SA comprises a communication part 13. The communication part 13 conducts information communication control between the nodes via the network 8. The center server SA comprises a display part 14. The display part 14 is a CRT or a liquid crystal display for displaying various items of information thereon. The center server SA comprises an input part 15. The input part 15 is a keyboard or a mouse, for example. The input part 15 receives an instruction from an operator and gives an instruction signal corresponding to the instruction to the control part 11. The control part 11, the storage part 12, the communication part 13, the display part 14 and the input part 15 are interconnected via a bus 16.

The storage part 12 stores the node ID, the IP address and the port number of a node therein. The storage part 12 stores therein each chunk to be distributed in association with the chunk ID. The storage part 12 stores the request queue and the request management table therein. The storage part 12 stores an operation system and various programs such as control programs therein. The CPU reads and executes a program stored in the storage part 12 so that the control part 11 functions as a second receiving unit and an uploading unit.

[3.2 Structure of Node]

Figure 5:
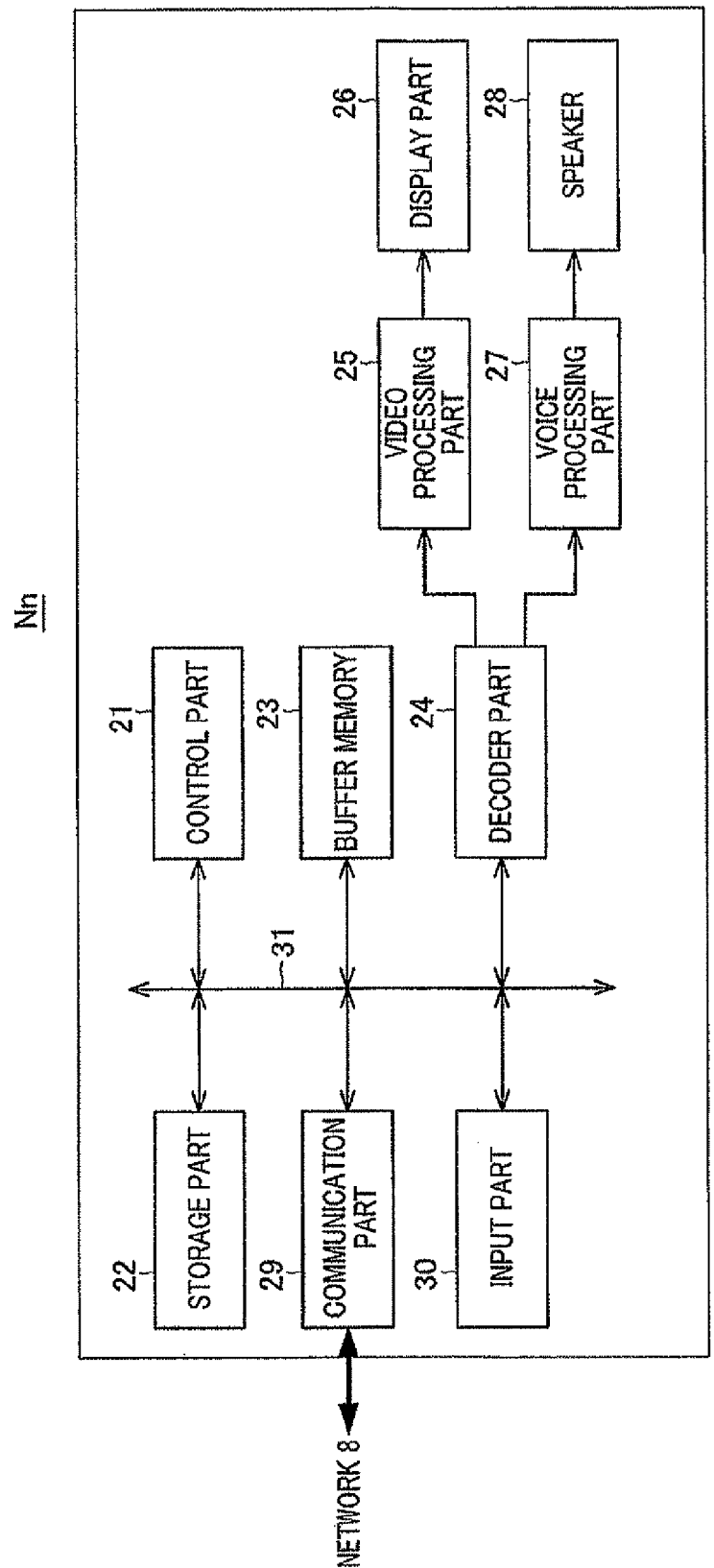
FIG. 5 is a diagram showing a schematic structure example of a node Nn.

The node comprises a control part 21 as a computer as shown in FIG. 5. The control part is configured of a CPU, a working RAM and a ROM. The CPU has a computing function. The ROM stores various items of data and programs therein. The node comprises a storage part 22 and a buffer memory 23. The storage part 22 is configured of a HD (hard disk). The storage part 22 stores and saves various items of data and various programs therein. The buffer memory 23 temporarily accumulates replicas of received contents therein. Each node comprises a decoder part 24. The decoder part 24 decodes encoded video data and audio data contained in the content replica. The node comprises a video processing part 25 and a display part 26. The video processing part 25 performs a predetermined drawing processing on the decoded video data to output a video signal. The display part 26 is a CRT or a liquid crystal display for displaying the video based on the video signal output from the video processing part 25. The node comprises a voice processing part 27 and a speaker 28. The voice processing part 27 D(Digital)/A(Analog) converts the decoded audio data into an analog audio signal, and amplifies and outputs the analog audio signal by an amplifier. The speaker 28 outputs the audio signal output from the voice processing part 27 as an acoustic wave. The node comprises a communication part 29. The communication part 29 conducts information communication control between other nodes via the network 8. The node comprises an input part 30. The input part 30 is a keyboard, a mouse, a remote controller or an operation panel, for example. The input part 30 receives an instruction from the user and gives an instruction signal corresponding to the instruction to the control part 21. Then, the control part 21, the storage part 22, the buffer memory 23, the decoder part 24, the communication part 29 and the input part 30 are interconnected via a bus 31.

The storage part 22 stores therein a DHT routing table, index information, and address information of the center server SA therein. The storage part 22 stores the downloaded chunks in association with the chunk IDs therein. The storage part 22 stores the request queue and the request management table therein. The storage part 22 stores an operating system and various programs therein. Various programs may be downloaded from the center server SA, for example. Various programs may be recorded in a recording medium such as DVD (Digital Versatile Disc) and may be read from the recording medium via a drive.

[4. Operations of Content Distribution/Storage System]

Figure 6:
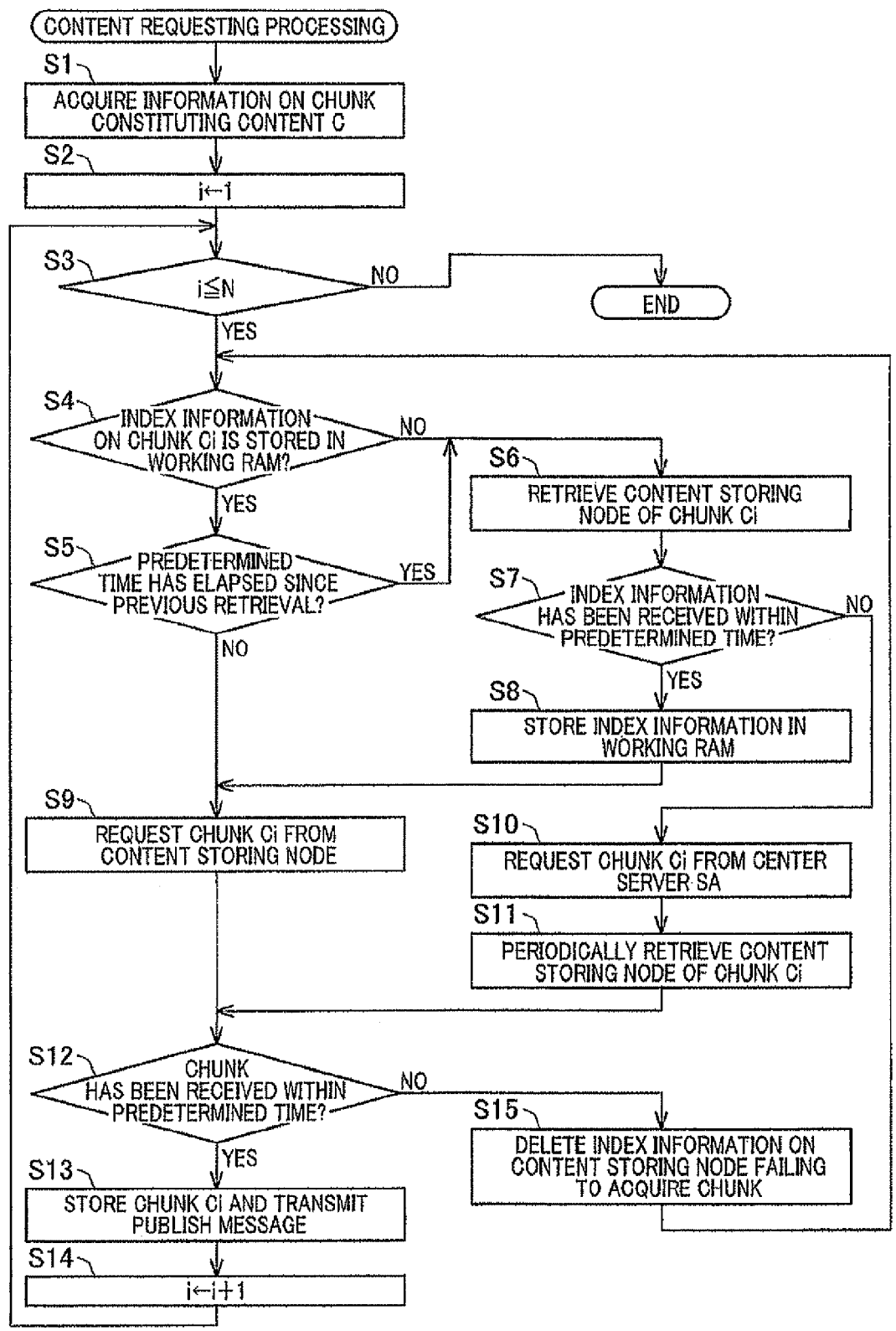
FIG. 6 is a flowchart showing a processing example of a content requesting processing of a control part 21 of a user node.

The operations of the content distribution/storage system according to the present embodiment will be described below with reference to FIGS. 6 to 8. In the flowchart of FIG. 6, a content requesting processing is started when the user operates the input part 30 to designate a desired content and the control part 21 acquires the content ID of the designated content, for example. The user-desired content is assumed as content C. Each chunk constituting the content C is assumed as chunk Ci (i=1, 2, 3 . . . N). Here, i denotes a sequence number. N denotes the total number of chunks constituting the content C.

At first, the control part 21 acquires the sequence number and the chunk ID of each chunk constituting the content corresponding to the acquired content ID based on the content ID (step S1). The control 21 calculates the number of acquired chunk IDs to calculate the total number N of chunks. Next, the control part 21 sets 1 for the sequence number i (step S2). The control part 21 decides whether the sequence number i is equal to or less than the total number N (step S3). At this time, when the sequence number i is equal to or less than the total number N (step S3: YES), the control part 21 decides whether the index information on the chunk Ci is being held in the working RAM (step S4). At this time, when the index information on the chunk Ci is being stored in the working RAM (step S4: YES), the control part 21 proceeds to step S5. On the other hand, when the index information on the chunk Ci is not stored in the working RAM (step S4: NO), the control part 21 proceeds to step S6. In step S5, the control part 21 decides whether a predetermined time has elapsed since the holder node of the chunk Ci was previously retrieved. At this time, when a predetermined time has elapsed since the holder node of the chunk Ci was previously retrieved (step S5: YES), the control part 21 deletes the index information from the working RAM and proceeds to step S6. On the other hand, when a predetermined time has not elapsed (step S5: NO), the control part 21 proceeds to step S9. Why the decision processings in steps S4 and S5 are present will be described later.

In step S6, the control part 21 retrieves the holder node of the chunk Ci. Specifically, the control part 21 transmits a retrieval message including the chunk ID of the chunk Ci toward the root node. Then, the control part 21 decides whether the index information has been received from the root node within a predetermined time since the transmission of the retrieval message (step S7). At this time, when the index information has been received within a predetermined time (step S7: YES), the control part 21 stores the index information in the working RAM (step S8) and proceeds to step S9. On the other hand, when the index information has not received even after a predetermined time (step S7: NO), the control part 21 proceeds to step S10.

In step S9, the control part 21 requests the chunk Ci for the holder node. Specifically, the control part 21 selects an arbitrary item of index information from among the items of index information stored in the working RAM. Then, the control part 21 transmits a chunk request message to the holder node indicated by the node information contained in the selected index information. At this time, the control part 21 sets the node information on the user node itself, the content ID of the content C and the chunk ID of the chunk Ci in the chunk request message to be transmitted. When terminating the processing in step S9, the control part 21 proceeds to step S12.

On the other hand, in step S10, the control part 21 requests the chunk Ci for the center server SA. Specifically, the control part 21 transmits the chunk request message to the center server SA. At this time, the control part 21 sets the node information on the user node itself, the content ID of the content C and the chunk ID of the chunk Ci in the chunk request message to be transmitted. Then, the control part 21 periodically retrieves the holder node for the chunk Ci at predetermined intervals while waiting for the reception of the chunk Ci (step S11). The retrieval processing at this time is similar to the processings in steps S6 to S8. When receiving the chunk Ci or when a predetermined time has elapsed since the chunk request message was transmitted, the control part 21 terminates the periodical retrieval and proceeds to step S12.

When a chunk storing node storing the chunk Ci therein is not present, the user node transmits the chunk request message to the center server SA. Thus, the requests from the user nodes more easily concentrate on the center server SA than on the node. When the requests concentrate, the upload of the chunk by the center server SA delays and the acquisition of the chunk from the center server SA may fail. The center server SA may upload the chunk Ci on other user node while the user node is waiting for the reception of the chunk Ci. Consequently, the number of holder nodes storing the chunk Ci therein increases. In this case, when the acquisition of the chunk Ci from the center server SA fails, the chunk Ci can be acquired from the holder node. Then, when the holder node can be previously retrieved, the user node does not need the retrieval after the acquisition of the chunk Ci fails. The control part 21 periodically conducts the retrieval. When retrieving the holder node by the periodical retrieval, the control part 21 may transmit the chunk request message to the holder node. Thus, the chunk Ci may be more quickly acquired than when the chunk Ci from the center server SA is waited. The user node quickly acquires the chunk Ci so that the number of holder nodes rapidly increases. Then, the concentration of the requests on the center server SA can be rapidly eliminated.

In step S12, the control part 21 decides whether it has received the chunk Ci within a predetermined time since it transmitted the chunk request message to the holder node or the center server SA. At this time, when having received the chunk Ci within a predetermined time (step S12: YES), the control part 21 stores the received chunk Ci in the storage part 22. Then, the control part 21 transmits the publish node to the root node (step S13). Thus, the chunk Ci is publicized. Next, the control part 21 adds 1 to the sequence number i (step S14) and proceeds to step S3.

On the other hand, when not having received the chunk Ci after a predetermined time (step S12: NO), the control part 21 deletes the index information selected when the chunk request message was transmitted from the working RAM (step S15). That is, the control part 21 deletes the index information on the holder node failing the acquisition of the chunk Ci. When terminating the processing in step S15, the control part 21 proceeds to step S4. When transmitting the chunk request message to the center server SA, the control part 21 proceeds to step S4 without performing the processing in step S15.

Why the decision processings in steps S4 and S5 are present will be described herein. The user node may acquire the index information on the holder nodes by the retrieval in step S6. When failing to acquire the chunk from the holder node, the user node tries to acquire the chunk from another holder node. At this time, since the index information on other holder node is stored in the working RAM, the user node does not need the retrieval again. The decision in step S4 is present for deciding such a case. On the other hand, if the acquisition of the chunk fails many times, the acquisition of the chunk may fail even if other holder node is requested. In this case, it may be better that the acquisition of the chunk is tried from a holder node different from the holder node retrieved so far. Therefore, the user node retrieves the holder node again. At this time, a holder node different from the previously-retrieved holder node is likely to be retrieved when the retrieval is conducted after a certain time from the previous retrieval. The decision in step S5 is present for waiting for a predetermined time until the next retrieval.

The control part 21 repeats the processings in steps S3 to S15 thereby to acquire the chunks C1 to CN. In step S3, the control part 21 decides that the sequence number i is not less than the total number N (step S3: NO) and terminates the content request processing.

Figure 7:
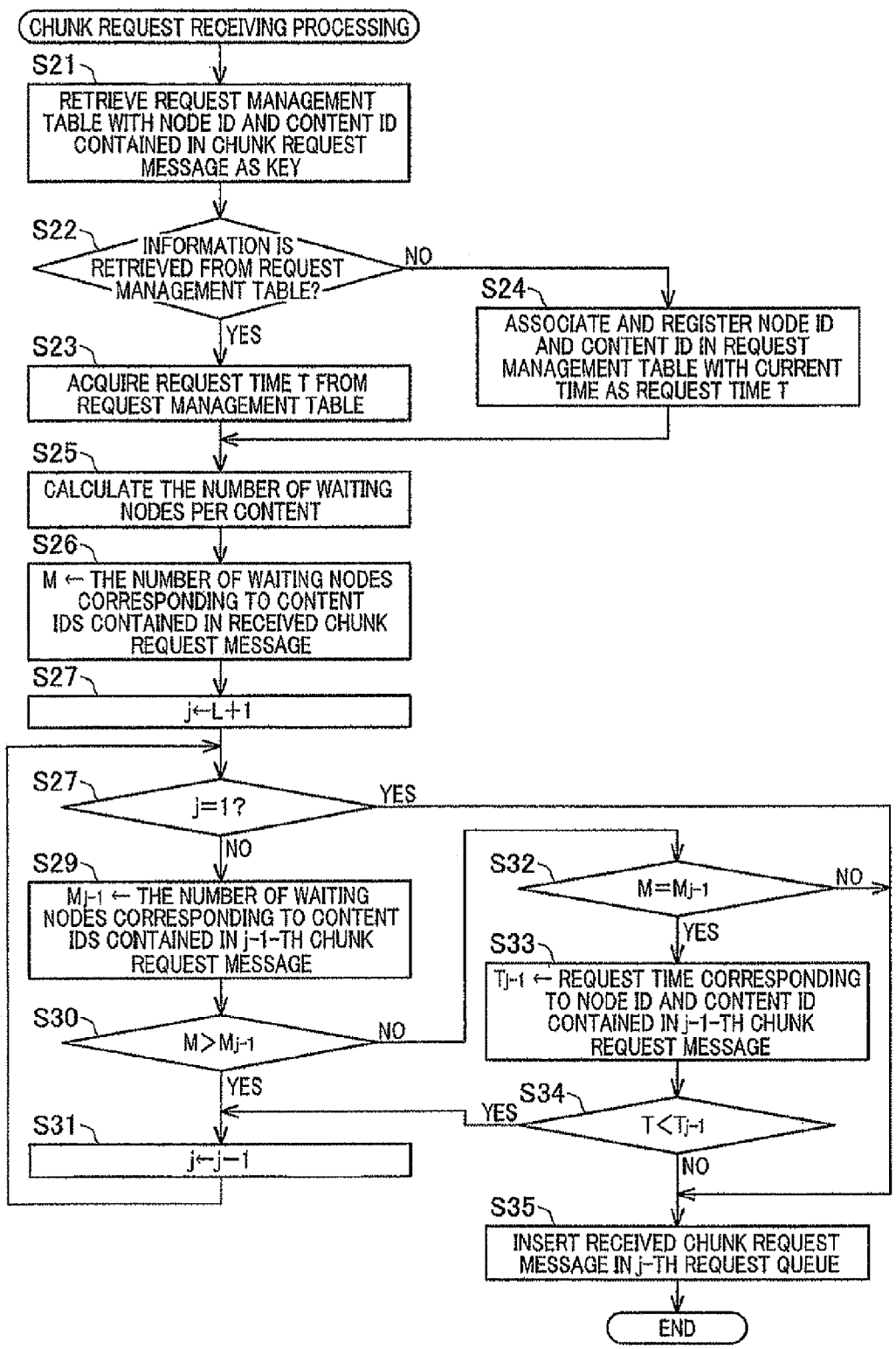
FIG. 7 is a flowchart showing a processing example of a chunk request receiving processing of the control part 21 of a holder node.

The chunk request receiving processing in FIG. 7 is started when the holder node receives the chunk request message from the user node.

At first, with the pair of node ID and content ID contained in the received chunk request message as a key, the control part 21 retrieves information containing the same pair from the request management table (step S21). Then, the control part 21 decides whether the information containing the same pair as the pair of node ID and content ID contained in the chunk request message has been retrieved (step S22). At this time, when the information containing the same pair has been retrieved (step S22: YES), the control part 21 acquires the request time contained in the retrieved information as the request time T from the request management table (step S23). On the other hand, when the information containing the same pair has not been retrieved (step S22: NO), the control part 21 acquires the current time as the request time T from the time counting function of the CPU. Then, the control part 21 registers the node ID and the content ID contained in the chunk request message in association with the request time T in the request management table (step S24).

When terminating the processing in step S23 or S24, the control part 21 decides the order in which the received chunk request messages are extracted, and stores the chunk request messages in the request queue in steps S25 to S35. At first, the control part 21 calculates the number of waiting nodes per content (step S25). Specifically, the control part 21 calculates the number of content IDs stored in the request queue per content ID. The content ID is actually contained in each chunk request message stored in the request queue. The control part 21 makes a calculation assuming that the chunk request message received at this time is temporarily stored in the request queue. That is, the control part 21 contains the chunk request message received at this time in the calculation of the number of waiting nodes.

Next, the control part 21 sets, for the number M of waiting nodes, the number of waiting nodes corresponding to the content IDs contained in the chunk request message received at this time among the calculated number of waiting nodes (step S26). Then, the control part 21 sets L+1 for the order j (step S27). The stored number L indicates the number of chunk request messages currently stored in the request queue except for the chunk request message received at this time. The request queue stores therein L chunk request messages assigned with the orders of 1 to L. The first chunk request message is first extracted. The order j is an order in which the chunk request message received at this time is extracted. L+1 or the final order is set for the initial value of the order j in which the chunk request message received at this time is extracted.

Next, the control part 21 decides whether the order j is the first (step S28). At this time, when the order j is not the first (step S28: NO), the control part 21 acquires the j−1-th chunk request message from among the chunk request messages stored in the request queue. The j−1-th chunk request message is a chunk request message having the order earlier by 1 than the order j of the chunk request message received at this time.

Next, the control part 21 sets, for the number $M_{j-1}$ of waiting nodes, the number of waiting nodes corresponding to the content IDs contained in the j−1-th chunk request message (step S29). The number $M_{j-1}$ of waiting nodes is the number of waiting nodes corresponding to the chunk request message having the order earlier by 1 than the chunk request message received at this time. The control part 21 decides whether the number M of waiting nodes corresponding to the chunk request message received at this time is more than the number $M_{j-1}$ of waiting nodes corresponding to the chunk request message having the order earlier by 1 than the chunk request message received at this time (step S30). At this time, when the number M of waiting nodes is more than the number $M_{j-1}$ of waiting nodes (step S30: YES), the control part 21 subtracts 1 from the order j (step S31) and proceeds to step S28. Thus, the order j in which the chunk request message received at this time is acquired is incremented by 1. The processings in steps S29 to S31 are for rearranging the order of the chunk request messages in the request queue based on the number of waiting nodes corresponding to the chunk request messages.

On the other hand, when the number M of waiting nodes is not more than the number $M_{j-1}$ of waiting nodes (step S30: NO), the control part 21 decides whether the number M of waiting nodes is equal to the number of waiting nodes (step S32). At this time, when the number M of waiting nodes is equal to the number $M_{j-1}$ of waiting nodes (step S32: YES), the control part 21 compares the request times. At first, the control part 21 retrieves the information containing the same pair as the pair of node ID and content ID contained in the j−1-th chunk request message from the request management table. Then, the control part 21 acquires the request time contained in the retrieved information as the request time $T_{j-1}$ from the request management table (step S33). The request time $T_{j-1}$ corresponds to the chunk request message having the order earlier by 1 than the chunk request message received at this time. The control part 21 decides whether the request time T corresponding to the chunk request message received at this time is earlier than the request time $T_{j-1}$ corresponding to the chunk request message having the order earlier by 1 (step S34). When the request time T is earlier than the request time (step S34: YES), the control part 21 proceeds to step S31. Thus, the order j in which the chunk request message received at this time is acquired is incremented by 1. The processings in steps S32 to 34 and S31 are for rearranging the order of the chunk request messages in the request queue based on the request time of the content corresponding to the chunk request message.

On the other hand, when the request time T is not earlier than the request time $T_{j-1}$ (step S34: NO), the control part 21 proceeds to step S35. When the number M of waiting node is less than the number $M_{j-1}$ of waiting nodes in step S32 (step S32: NO), the control part 21 proceeds to step S35. When the order j is the first in step S28 (step S28: YES), the control part 21 proceeds to step S35.

In step S35, the control part 21 inserts the chunk request message received at this time into the j-th in the request queue. Specifically, the control part 21 decrements by 1 the order of each chunk request message exceeded by the chunk request message received at this time. The control part 21 stores the chunk request message in the request queue such that the order in which the chunk request message received at this time is extracted is the j-th. When terminating the processing in step S35, the control part 21 terminates the chunk request receiving processing.

Figure 8:
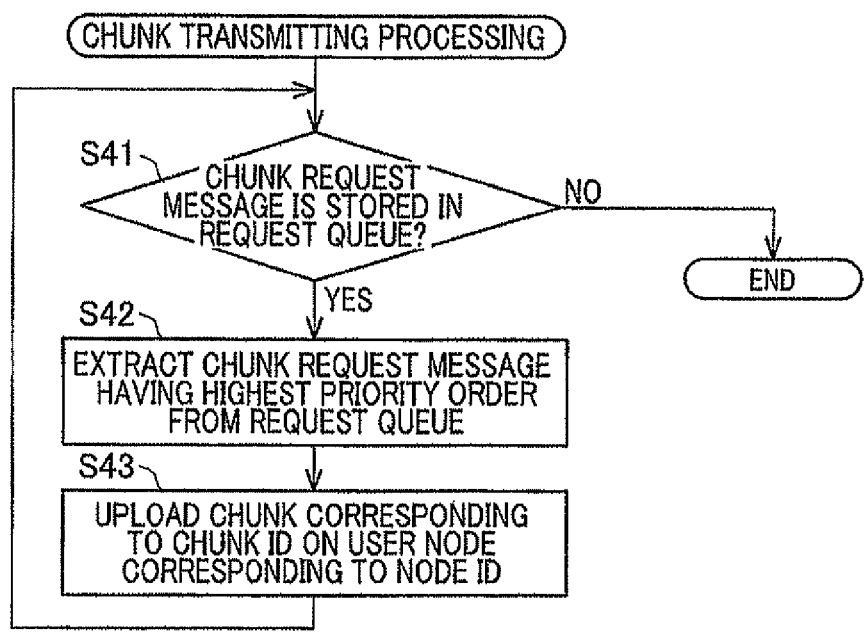
FIG. 8 is a flowchart showing a processing example of a chunk transmitting processing of the control part 21 of the holder node.

The chunk transmitting processing in FIG. 8 is started when the chunk request message is stored in the request queue while the chunk request message is not being stored in the request queue.

At first, the control part 21 decides whether the chunk request message is being stored in the request queue (step S41). When the chunk request message is being stored in the request queue (step S41: YES), the control part 21 extracts the chunk request message having the highest priority order from the request queue (step S42). That is, the control part 21 extracts the chunk request message having the earliest order from the request queue. Then, the control part 21 deletes the extracted chunk request message from the request queue.

Next, the control part 21 uploads the chunk on the user node (step S43). Specifically, the control part 21 acquires the chunk corresponding to the chunk ID contained in the extracted chunk request message from the storage part 22. Then, the control part 21 uploads the acquired chunk based on the node information contained in the extracted chunk request message. At this time, the control part 21 uploads the chunk on the user node corresponding to the node ID contained in the node information. When completing the upload, the control part 21 proceeds to step S41. In step S41, when the chunk request message is not being stored in the request queue (step S41: NO), the control part 21 terminates the chunk transmitting processing.

In the above embodiment, the user node sets the content ID for the chunk request message to be transmitted to the holder node. However, the content ID may not be contained in the chunk request message. The chunk request message contains the chunk ID therein. When the chunk ID of the chunk to be acquired is specified, the content constituting the chunk is uniquely decided. The holder node may acquire the content ID of the requested content from the chunk ID. For example, when the content is divided into the chunks in the center server SA, for example, the content ID of the original content is set in the header information of each chunk. Then, each chunk in which the content ID is set in the header information is distributed and stored in each node. When receiving the chunk request message, the holder node specifies the chunk stored in the storage part 22 from the chunk ID contained in the chunk request message. Then, the holder node acquires the content ID set in the header information of the specified chunk. Thus, the holder node can register the acquired content ID, the node ID contained in the chunk request message, and the request time in an associated manner in the request management table. The holder node can acquire the request time corresponding to the combination of the acquired content ID and the node ID contained in the chunk request message from the request management table. The holder node permits the acquisition of the chunk in early order of the time when the chunk request message is received.

For example, the center server SA may create and store the list indicating the correspondence of each chunk constituting the content and the chunk ID. In this case, the holder node inquires of the center server SA about the content ID corresponding to the chunk ID, for example. Specifically, when receiving the chunk request message, the holder node acquires the chunk ID from the chunk request message. The holder node transmits an inquiry message containing the acquired chunk ID to the center server SA. The center server SA acquires the content ID corresponding to the chunk ID contained in the received inquiry message from the list. Then, the center server SA transmits the content ID to the holder node. For example, the list indicating the correspondence between the content ID and the chunk ID may be stored in each node. In this case, the center server SA distributes the created list to each node, for example.

The holder node may register the node ID and the request time in the request management table and may not register the content ID therein. In this case, the holder node receiving the chunk request message retrieves the node ID contained in the chunk request message, for example, from the request management table. When the node ID contained in the chunk request message is not registered in the request management table, the holder node registers the node ID and the request time in an associated manner in the request management table. In this case, the chunk is uploaded in early user-node's order of the time when the holder node receives the content request irrespective of which content the user node requests.

In the above embodiment, the user node directly transmits the node information, the content ID and the chunk ID required for acquiring the chunk in the chunk request message to the holder node. However, the information required for acquiring the chunk may be transmitted to the holder node via a root node, for example. For example, the user node transmits the retrieval message containing the node information, the content ID and the chunk ID to the root node. The root node selects the holder node for storing therein the chunk corresponding to the chunk ID contained in the retrieval message. The root node instructs the selected holder node to upload the chunk. Specifically, the root node transmits the chunk transmission instruction message to the holder node. At this time, the root node sets the node information, the content ID and the chunk ID contained in the retrieval message for the chunk transmission instruction message. When receiving the chunk transmission instruction message, the holder node may perform the processings like when receiving the chunk request message.

When storing the chunk request messages in the request queue, the holder node may sort the order in which the chunk request messages are extracted based on the number of waiting nodes having the same content. The holder node may evenly extract the chunk request message based on the number of waiting nodes having the same content. For example, it is assumed that the number of waiting node for the content X is 4, the number of waiting nodes for the content Y is 2 and the number of waiting nodes for the content Z is 1. In this case, the holder nodes rearranges the order such that the chunk request messages are extracted in the order of X, X, Y, X, X, Y and Z. In this case, for the same content, the chunk request message from the user node having an earlier request time is extracted earlier. The holder node may not consider the number of waiting nodes for the same content. In this case, the chunk request messages may be stored in the request queue based on the request time only. The holder node may extract the chunk request messages from the request queue ahead of the contents having a largest number of content IDs registered in the request management table.

In the above embodiment, only when transmitting the chunk request message to the center server SA, the user node periodically retrieves the holder node. However, the user node may periodically conduct the retrieval also when transmitting the chunk request message to the holder node. The holder node may not conduct the periodical retrieval when transmitting the chunk request message. In the above embodiment, each node stores the request queue and the request management table therein and controls the upload for the chunk request message. However, only part of nodes may control the upload.

In the above embodiment, the peer-to-peer network using DHT is applied to the overlay network but the present invention is not limited thereto. For example, a system using other peer-to-peer system or overlay network may be applied. The peer-to-peer system not using DHT may be a hybrid peer-to-peer system, for example. The present invention is not confined to the configuration listed in the foregoing embodiments, but it is easily understood that the person skilled in the art can modify such configurations into various other modes, within the scope of the present invention described in the claims.

Although an illustrative embodiment and examples of modifications of the present invention have been described in detail herein, the scope of the invention is not limited thereto. It will be appreciated by those skilled in the art that various modifications may be made without departing from the scope of the invention. Accordingly, the embodiment and examples of modifications disclosed herein are merely illustrative. It is to be understood that the scope of the invention is not to be so limited thereby, but is to be determined by the claims which follow.

The invention claimed is:

1. An information communication system comprising:
a plurality of node devices configured to connect to a network, in which data is distributed and stored in the plurality of node devices, and the data is configured to be divided into a plurality of items of division data, the plurality of node devices including: (i) a first node device configured to store the division data, (ii) a distributing device configured to distribute the division data, and (iii) an acquiring node device configured to acquire the division data from the first node device storing the division data therein,
the acquiring node device including: a processor, and a memory configured to store a program to be executed by the processor,
wherein the processor transmits request information containing first identification information for identifying the division data constituting a content to be requested, and second identification information for identifying the acquiring node device requesting data, to the first node device configured to store the division data indicated by the first identification information, and acquires the division data indicated by the first identification information from the first node device; and
the processor causes the memory to store the division data acquired by the processor and the processor sets the division data stored in the memory to be acquired by other node devices;
the first node device including: a first processor, and a first memory configured to store a first program to be executed by the first processor,
wherein the first processor receives the request information transmitted from the acquiring node device; the first processor acquires third identification information for identifying content requested by the acquiring node device;
the first processor causes the first memory to store the second identification information contained in the request information received by the first processor, the third identification information acquired by the first processor, and time information indicating when the request information is received, corresponding to each other; and
the distributing device including: a second processor, and a second memory configured to store a second program to be executed by the second processor,
wherein the second processor causes the second memory to store the division data therein; and
the second processor receives the request information transmitted from the acquiring node device, wherein:
the second processor uploads the division data indicated by the first identification information received by the second processor, on the acquiring node device indicated by the second identification information contained in the request information,
the processor of the acquiring node device periodically conducts the retrieval in response to deciding that only the distributing device is storing the division data therein as a result of the retrieval,
the processor of the acquiring node device transmits the request information to the first node device retrieved by tile processor or the distributing device,
the processor of the acquiring node device acquires the division data from the first node device or the distributing device to which the request information is to be transmitted, and
the first processor permits the acquiring node device indicated by the second identification information contained in the request information to acquire the division data indicated by the first identification information contained in the request information, prior to permitting other node devices to acquire division data, if the content indicated in the third identification information stored in correspondence with the time information indicating received time of the request information from the acquiring node device has been requested prior to the time request information from the other node devices are received.

2. The information communication system according to claim 1, wherein
the first processor causes the first memory to store a queue from which the request information is extracted, in early order of the time when the request information is received, as the queue in which the request information received by the first processor is stored, and
the first processor uploads the division data indicated by the first identification information contained in the extracted request information, on the node device indicated by the second identification information contained in the request information extracted from the queue.

3. The information communication system according to claim 2, wherein when the request information is received by the first processor, the first processor decides the order in which the received request information is extracted from the queue based on the time indicated by the time information stored in the first memory, and stores the request information in the queue based on the decided order.

4. The information communication system according to claim 1,
wherein the processor periodically retrieves the first node device storing therein the division data constituting a content to be requested,
the processor transmits the request information to the first node device retrieved by the processor, and
in response to acquiring the division data by the processor, the processor sets the division data to be acquired by the acquiring node device.

5. The information communication system according to claim 1, wherein the first processor permits the division data to be preferentially acquired from the content for which the number of the node devices waiting for the acquisition of the division data is great.

6. The information communication system according to claim 5, wherein the plurality of node devices requesting the division data constituting the same content are configured to be permitted to acquire the division data in early order of the time when the request information containing the second identification information stored in the first memory is received.

7. The information communication system according to claim 1, wherein the plurality of node devices include plural first node devices each comprising a first processor and a first memory.

8. The information communication system according to claim 1, wherein the first processor decides whether the second identification information contained in the request information received by the first processor is being stored in the first memory; and in response to deciding that the second identification information is not being stored in the first memory, store the second identification information contained in the request information received by the first processor, and the time information indicating when the request information is received by the first processor, in an associated manner, in the first memory, and the first processor permits the node device indicated by the second identification information contained in the request information received by the first processor to acquire the division data in early order of the receipt time indicated by the time information corresponding to the second identification information.

9. A node device in an information communication system comprising:

a plurality of node devices configured to be connected to a network, in which data is distributed and stored in the plurality of node devices, and the data is configured to be divided into a plurality of items of division data, the plurality of node devices including: (i) a first node device configured to store the division data, (ii) a distributing device configured to distribute the division data, and (iii) and an acquiring node device configured to acquire the division data from node devices of the plurality of node devices storing the division data therein, at least one first node device of the plurality of node devices including: a first processor, and a first memory configured to store a program to be executed by the first processor, wherein the first processor receives request information containing first identification information for identifying the division data constituting a requested content, and second identification information for identifying the acquiring node device requesting a content, from the acquiring node device; the first processor acquires third identification information for identifying content requested by the acquiring node device;

the first processor causes the first memory to store the second identification information received by the first processor, the third identification information acquired by the first processor, and time information indicating when the request information is received, corresponding to each other;

the distributing device including: a second processor, and a second memory configured to store a second program to be executed by the second processor, wherein the second processor causes the second memory to store the division data therein; and the second processor receives the request information transmitted from the acquiring node device, wherein:

the second processor uploads the division data indicated by the first identification information received by the second processor, on the acquiring node device indicated by the second identification information contained in the request information, a processor of the acquiring node device periodically conducts the retrieval in response to deciding that only the distributing device is storing the division data therein as a result of the retrieval, the processor of the acquiring node device transmits the request information to the first node device retrieved by the processor or the distributing device, the processor of the acquiring node device acquires the division data from the first node device or the distributing device to which the request information is to be transmitted, and the first processor permits the acquiring node device indicated by the second identification information contained in the request information to acquire the division data indicated by the first identification information contained in the request information prior to permitting other node devices to acquire division data, if the content indicated in the third identification information stored in correspondence with the time information indicating received time of the request information from the acquiring node device has been requested prior to the time request information from the other node devices are received.

10. An information processing method in an information communication system formed of a plurality of node devices configured to be connected to a network, in which data is distributed and stored in the plurality of node devices, and the data is configured to be divided into a plurality of items of division data, the plurality of node devices including: (i) a first node device configured to store the division data, (ii) a distributing device configured to distribute the division data, and (iii) and an acquiring node device configured to acquire the division data from node devices of the plurality of node devices storing the division data therein, the method including steps in the acquiring node device and steps in at least one first node device of the plurality of node devices, the steps in the acquiring node device, comprising:

transmitting request information containing first identification information for identifying the division data constituting a content to be requested, and second identification information for identifying the acquiring node device requesting a content, to a first node device configured to store the division data indicated by the first identification information therein;

acquiring the division data indicated by the first identification information contained in the request information transmitted in the transmitting step, from the first node device;

first-storing the division data acquired in the acquiring step; and setting the division data stored in the first storing step to be acquired by other node devices, and the steps in the at least one first node device comprising:

first-receiving the request information transmitted from the acquiring node device;

first-acquiring third identification information for identifying content requested by the acquiring node device;

second-storing the second identification information contained in the request information received in the first receiving step, the third identification information acquired in first-acquiring step, and time information indicating when the request information is received, corresponding to each other;

setting the node device indicated by the second identification information contained in the request information to acquire the division data indicated by the first identification information contained in the request prior to permitting other node devices to acquire division data, if the content indicated in the third identification information stored in correspondence with the time information indicating received time of the request information from the acquiring node device has been requested prior to the time request information from the other node devices are received;

the steps in the distributing device comprising:

receiving the request information transmitted from the acquiring node device;

uploading the division data indicated by the first identification information, on the acquiring node device, periodically conducting the retrieval, by the acquiring node device, in response to deciding that only the distributing device is storing the division data therein as a result of the retrieval, transmitting, by the acquiring node device, the request information to the first node device retrieved by the processor or the distributing device, and acquiring, by the acquiring node device, the division data from the first node device or the distributing device to which the request information is to be transmitted.

11. A non-transitory computer-readable storage medium that stores a computer-executable program, the program causing a computer included in at least one node device in an information communication system formed of a plurality of node devices configured to be connected to a network, in which data is distributed and stored in the plurality of node devices, and the data is configured to be divided into a plurality of items of division data, the plurality of node devices including: (i) a first node device configured to store the division data, (ii) a distributing device configured to distribute the division data, and (iii) and an acquiring node device configured to acquire the division data from node devices of the plurality of node devices storing the division data therein, the acquiring node device performing steps comprising:

first-receiving request information containing first identification information for identifying the division data constituting a requested content, and second identification information for identifying the acquiring node device requesting a content, from the acquiring node device;

first-acquiring third identification information for identifying content requested by the acquiring node device;

second-storing the second identification information received in the first receiving step, the third identification information acquired in first-acquiring step, and time information indicating when the request information is received, corresponding to each other; and permitting the acquiring node device indicated by the second identification information contained in the request information to acquire the division data indicated by the first identification information contained in the request information prior to permitting other node devices to acquire division data, if the content indicated in the third identification information stored in correspondence with the time information indicating received time of the request information from the acquiring node device has been requested prior to the time request information from the other node devices are received, and the distributing device comprising: receiving the request information transmitted from the acquiring node device;

uploading the division data indicated by the first identification information, on the acquiring node device, periodically conducting the retrieval, by the acquiring node device, in response to deciding that only the distributing device is storing the division data therein as a result of the retrieval, transmitting, by the acquiring node device, the request information to the first node device retrieved by the processor or the distributing device, and acquiring, by the acquiring node device, the division data from the first node device or the distributing device to which the request information is to be transmitted.

* * * * *